Figure 1:
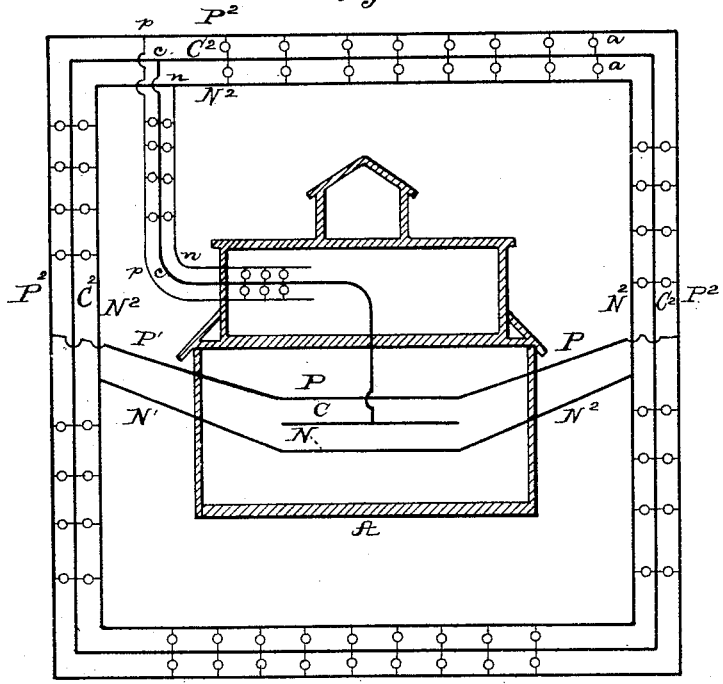

(No Model.) 2 Sheets—Sheet 1.

W. S. ANDREWS & T. SPENCER.
SYSTEM OF ELECTRIC LIGHTING.

No. 318,157. Patented May 19, 1885.

ATTEST: E. H. Rowland
J. G. Greene Jr.

INVENTORS: William S. Andrews
Thomas Spencer
By Dyer & Seely
Attys.

(No Model.) 2 Sheets—Sheet 2.

W. S. ANDREWS & T. SPENCER.
SYSTEM OF ELECTRIC LIGHTING.

No. 318,157. Patented May 19, 1885.

UNITED STATES PATENT OFFICE.

WILLIAM S. ANDREWS, OF NEW YORK, N. Y., AND THOMAS SPENCER, OF SOUTH MERIDEN, CONNECTICUT.

SYSTEM OF ELECTRIC LIGHTING.

SPECIFICATION forming part of Letters Patent No. 318,157, dated May 19, 1885.

Application filed January 17, 1885. (No model.)

*To all whom it may concern:*

Be it known that we, WILLIAM S. ANDREWS, of New York, in the county and State of New York, and THOMAS SPENCER, of South Meriden, in the county of New Haven and State of Connecticut, have invented a certain new and useful Improvement in Systems of Electric Lighting, of which the following is a specification.

Our invention relates to the "compensating" or "three-wire" system of electrical distribution, and our object is to diminish the amount of metal required for conductors in such a system.

Heretofore the general arrangement of a system of this character has been as follows: At the central station are situated two electrical generators or two series or groups of generators connected together in series. One terminal of the series is connected with one of the main or "omnibus" conductors at the central station, and the other terminal with another, while the third or central omnibus wire is connected between the generators or groups thereof, the source of supply being thus divided into two parts. From the omnibus wires the feeding-circuits extend, each consisting of three wires, to the system of intersecting and connected positive and negative and compensating main conductors, in connection with which the lamps or other translating devices of the system are arranged in multiple series, as is now well understood. By our invention we do away with the central wire of each feeding-circuit, thus diminishing the metal required for the feeding-circuits by one-third. This is a very great saving in the cost of a system, the feeding-conductors being usually of very heavy wire.

In carrying our invention into effect we employ only two wires for each feeding-circuit, extending each from one of the omnibus wires to a positive or negative main or lighting conductor, while at some convenient point, which will usually be that at which the lighting-conductors approach most nearly to the omnibus wires, a wire heavy enough to carry the whole current of the largest generator of the system extends from the central omnibus wire or directly from the point of division of the source of supply, which is precisely equivalent to the central one of such lighting-wires. This single conductor acts as the compensating-conductor for all the feeders. In most systems of this character a derived circuit extends at some point from the lighting-conductors into the central station for lighting the station. In such case we make the center wire of this derived circuit of sufficient size for the purpose and connect it with the center omnibus wire; but in case the lighting-conductors approach very closely to the station-building we simply extend a single conductor of sufficient size from the center lighting-conductor to the center omnibus wire.

Our invention may be more readily understood by reference to the annexed drawings, in which—

Figure 2:
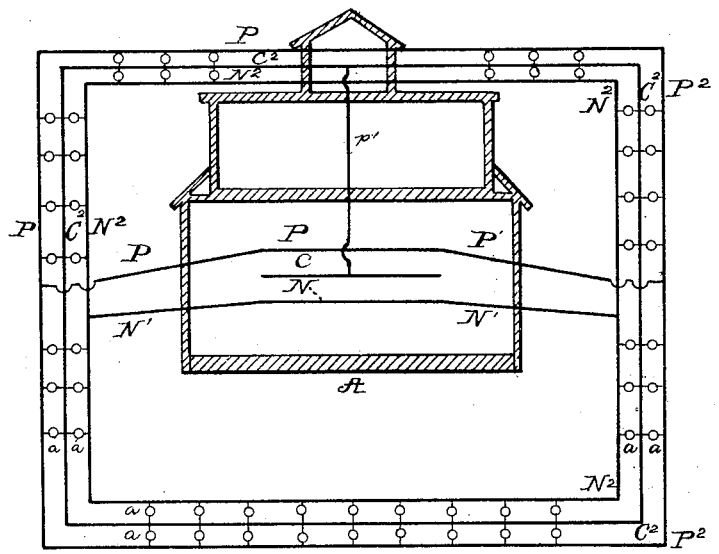
Figure 3:
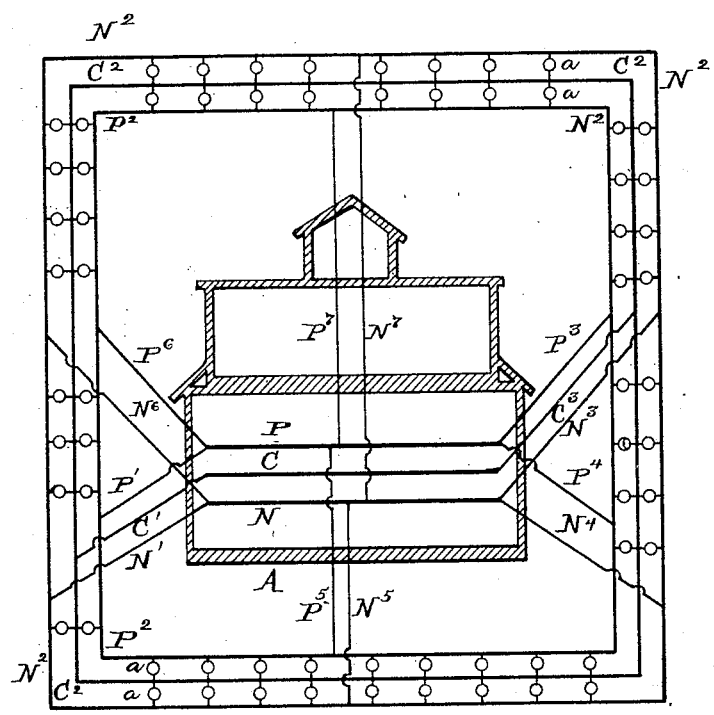

Figure 1 is a diagram of a system embodying our invention, in which the center wire of the station-lamp circuit is used as the feeder compensating-wire. Fig. 2 represents a system in which a single wire extends from the lighting-conductors to the station, and Fig. 3 is a diagram of a modified form of the invention.

Like letters refer to corresponding parts in all the figures.

A is the central-station building.

P, N, and C are respectively the positive, negative, and compensating omnibus wires, with which the terminals and central connecting-wire of the series of generators or groups thereof (not shown) are connected.

P' N' are feeding-circuits, each consisting of a positive and a negative conductor extending from the positive and negative omnibus wires.

$P^2$ $N^2$ $C^2$ represent the system of lighting-wires, which extend throughout the district, and are connected, positive to positive, negative to negative, and compensating to compensating at the points where they intersect. With these lighting-wires, or with house-circuits extending therefrom, the electric lamps or other translating devices *a a* are connected in multiple series.

Heretofore, as above explained, each feeding-circuit has comprised a third or compensating-wire extending from C to a conductor, C²; but this is done away with in our system.

In Fig. 1, *p n c* is a derived circuit from a convenient point of P² N² C², extending into the central station and supplying lamps *a* for lighting the building. The center wire, *c*, of this circuit is of such size as to be adapted to carry the whole current of the largest generator of the system, if necessary, and is connected with conductor C, or, in other words, to the point of division of the source of supply, and it thus forms the compensating-wire, which maintains the balance of the system for all the feeders, the current flowing in one direction or the other in it, according to the changes in the number of lamps in circuit on the two sides of the system.

In practice, in the ordinary use of the system, very little current will flow in this conductor, the balance being usually nearly maintained. It is preferred, however, to make this conductor large enough to convey the current of the largest generator, for it may be used as the return-conductor of the system should all the generators but one become inoperative, in which case the positive and negative conductors of each feeder are connected together to form one conductor, while the compensating feeding-conductor is the other, as set forth in the application of the said William S. Andrews, Serial No. 146,894.

In Fig. 2 a system similar to that of Fig. 1 is shown, in which a line of lighting-conductors, P² N² C², runs close to the central station, being represented as passing through the cupola of the building. In this case all that is required is the large conductor *p'*, extending from C² to C, which wire then forms the single compensating-conductor for all the feeding-circuits.

It is evident that our invention is equally applicable whether the conductors of the system are run overhead or underground, and also that the same may be readily applied to systems already in operation by removing the center wire of each feeder and providing the single short connecting-wire without changing the balance of the system or altering existing determinations. Thus a saving of one-third on the feeders is effected, the extra wire required being so short as to be of little consequence.

A portion of the advantages of our invention may be obtained by employing, in connection with one or two or more of the feeding-circuits, a compensating-conductor, while the feeding-circuits remaining consist each of two wires. It is evident that this will result in the saving of a certain amount of metal. This modification is illustrated in Fig. 3, in which there are six feeding-circuits, P' N' P³ N³ P⁴ N⁴, &c. The circuits P' N' and P³ N³ have each a third wire or compensating-conductor, C' or C³, while the remaining feeding-circuits have no such conductors.

What we claim is—

1. In a compensating system of electrical distribution, the combination, with two or more feeding-circuits, of a single compensating-conductor for both or all of them, substantially as set forth.

2. In a compensating system of electrical distribution, the combination of the lighting-circuits consisting of positive, negative, and compensating conductors, the two or more feeding-circuits, each consisting of a positive and a negative conductor, and a single conductor extending from a compensating-conductor of the lighting-circuits to the point of division of the source of supply, substantially as set forth.

3. In a compensating system of electrical distribution, the combination of the lighting-circuits consisting of positive, negative, and compensating conductors, the two or more feeding-circuits, each consisting of a positive and a negative conductor, and a derived circuit from said lighting-conductors, consisting of positive and negative conductors, between which electric lamps are connected in multiple series, and a compensating-conductor connected at the point of division of the source of supply, substantially as set forth.

4. In a compensating system of electrical distribution, the combination of the lighting-circuits consisting of positive, negative, and compensating conductors, the two or more feeding-circuits, each consisting of a positive and a negative conductor, and a conductor extending from a compensating-conductor of the lighting-circuits to the point of division of the source of supply, said conductor being of sufficient size to convey the current of the largest generator of the system, substantially as set forth.

WILLIAM S. ANDREWS.
THOMAS SPENCER.

Witnesses as to Andrews:
GEO. H. BLISS,
F. H. WHITING.
Witnesses as to Spencer:
J. C. HILL,
P. B. SHAW.